April 13, 1926.  1,580,432
R. T. GRIFFITHS
METHOD OF MAKING SINUOUS HARD RUBBER ARTICLES
Filed Dec. 31, 1925
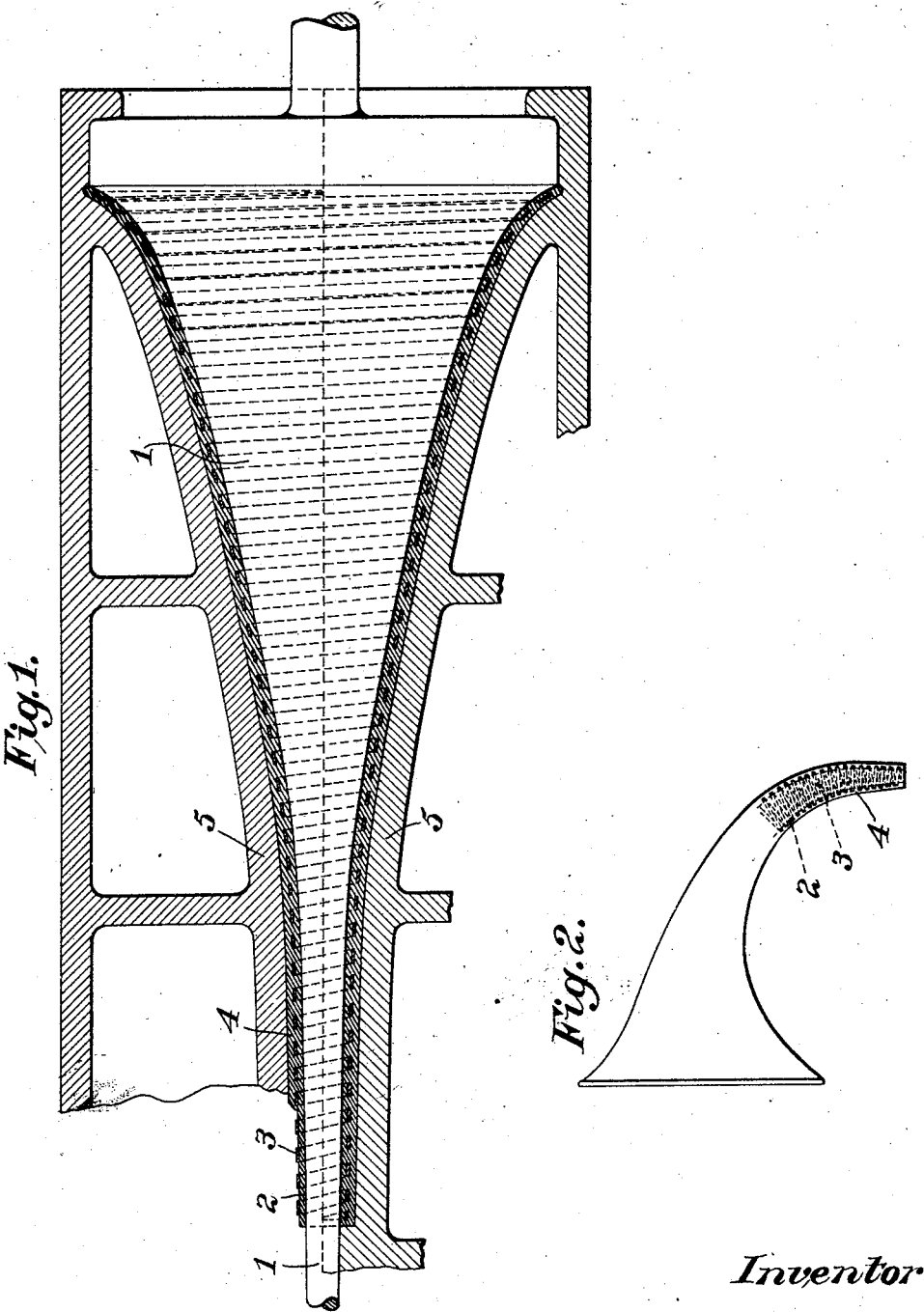
Inventor:
Richard T. Griffiths,
by Attys.

Patented Apr. 13, 1926.

1,580,432

UNITED STATES PATENT OFFICE.

RICHARD T. GRIFFITHS, OF AKRON, OHIO, ASSIGNOR TO THE MILLER RUBBER COMPANY, OF AKRON, OHIO, A CORPORATION OF OHIO.

METHOD OF MAKING SINUOUS HARD-RUBBER ARTICLES.

Application filed December 31, 1925. Serial No. 78,647.

*To all whom it may concern:*

Be it known that I, RICHARD T. GRIFFITHS, a citizen of the United States, and resident of Akron, in the county of Summit and State of Ohio, have invented certain new and useful Improvements in Methods of Making Sinuous Hard-Rubber Articles, of which the following is a specification.

My present invention relates to an improved method of making hollow articles of curved or sinuous form from hardened plastic material, and concerns more particularly a method of producing horns or amplifiers such as used for radio loud speakers and analogous purposes, composed of hard rubber, though not limited to this specific material or use.

The making of articles of this character has heretofore been rendered difficult due to the fact that as a smooth interior is necessary, a core must be used to mold such surface, and the removal of the core is a problem which has been hard to solve.

The present invention aims to provide a method which will solve the problem and enable the article to be readily and economically manufactured no matter how complicated its shape.

The invention includes the novel method as hereinafter described, and particularly defined in the appended claims.

In order that the invention may be more readily understood reference is made to the accompanying drawing, in which:—

Figure 1 is a sectional view through a horn core and mold, to illustrate the initial step in the process.

Fig. 2 is a view of the horn separated from the mold and core, after the same has been bent to the desired shape.

In proceeding according to my invention I apply to the surface of a mandrel or core 1, having a straight axis, a layer of rubber compound indicated at 2, such rubber compound being of a character which when vulcanized will produce hard rubber. Around this I place a metal reinforcement 3 which is preferably in the shape of a flat wire of metal of such character that it may be bent, and when bent will retain its shape. By the use of a flat wire or strip as the reinforcement, this may be wound on the layer 2 without being forced too deeply into the surface of said layer.

After the wire has been wound on the surface of the layer 2 in spiral form, another layer 4 is applied overlapping the layer 2 with its superposed reinforcement, and the whole is then enclosed in a mold indicated at 5, which is subjected to a temperature sufficient to vulcanize the layers 2 and 4 to the consistency of soft rubber, or in other words, to semi-vulcanize them, whereby they are homogeneously united and are in such condition as to retain their shape when removed from the mold and separated from the core, but are capable of being flexed.

After such removal, the horn or other article is bent to the desired shape such as that shown in Fig. 2, for example, and the bendable metal reinforcement causes the horn to remain in the shape to which it is bent. Thereafter it may be further vulcanized to produce the hard rubber article.

Having thus described my invention, what I claim is:—

1. The hereindescribed method of making hollow articles of curved form, from hardened plastic material, which consists in molding the plastic material in straight form, having incorporated therein a reinforcement of bendable metal, removing the article from the mold and bending it to the desired shape, and thereafter hardening the plastic material.

2. The hereindescribed method of making hollow articles of curved form from hardened plastic material, which consists in applying to a core having a straight axis, an enclosing layer of plastic material, applying to the surface thereof a reinforcement of bendable metal having spaces through which the plastic material may project, applying thereover a second layer of plastic material, partially hardening the plastic material, removing the core, and bending the article to the desired form, and thereafter completing the hardening.

3. The hereindescribed method of making hollow articles of curved form from hard rubber, which consists in applying a layer of hard vulcanizing rubber compound to a core having a straight axis, winding a strip of bendable metal around said layer, applying a second layer of similar compound thereover, subjecting the rubber compound to a temperature sufficient to partially vulcanize the same, removing the core from the article, bending the article into the desired form, and thereafter subjecting it to further vulcanization to complete the cure.

4. The hereindescribed method of making hollow articles of curved form from hard rubber, which consists in applying a layer of hard vulcanizing rubber compound to a core having a straight axis, winding a strip of flat bendable metal around said layer, applying a second layer of similar compound thereover, subjecting the rubber compound to a temperature sufficient to partially vulcanize the same, removing the core from the article, bending the article into the desired form, and thereafter subjecting it to further vulcanization to complete the cure.

In testimony whereof, I affix my signature.

RICHARD T. GRIFFITHS.